United States Patent [19]

Kinzenbaw

[11] Patent Number: 4,506,904

[45] Date of Patent: Mar. 26, 1985

[54] AGRICULTURAL IMPLEMENT CONVERTIBLE BETWEEN USE AND TRANSPORT POSITIONS

[75] Inventor: Jon E. Kinzenbaw, Williamsburg, Iowa

[73] Assignee: Kinze Manufacturing, Inc., Williamsburg, Iowa

[21] Appl. No.: 424,890

[22] Filed: Sep. 27, 1982

[51] Int. Cl.³ .................. B60D 1/14; B62D 53/04
[52] U.S. Cl. .................. 280/415 R; 172/625; 280/411 R
[58] Field of Search ............ 280/415 R, 411 R, 412, 280/478, 462, 463, 491 R, 491 B, 491 D; 172/625, 280; 56/228

[56] References Cited

U.S. PATENT DOCUMENTS

| | | | |
|---|---|---|---|
| 3,635,495 | 1/1972 | Ovendorff | 280/415 R |
| 4,119,329 | 10/1978 | Smith | 280/415 R |
| 4,162,085 | 7/1979 | Miranowski | 280/412 |
| 4,223,741 | 9/1980 | Blumhardt | 280/415 R |
| 4,340,239 | 7/1982 | Shoup | 280/415 R |
| 4,361,341 | 11/1982 | Gustafson | 280/415 R |

Primary Examiner—Joseph F. Peters, Jr.
Assistant Examiner—Donn McGiehan
Attorney, Agent, or Firm—Emrich & Dithmar

[57] ABSTRACT

An agricultural implement includes an elongated carrier frame with support wheels. One or more tool sections, each having tools mounted to a tool mounting bar, are mounted to the carrier frame. The tool sections are independently raised and lowered between the transport and use positions by hydraulic cylinders. The carrier frame is attached to a tractor by a hitch assembly which includes a control link. With the tractor in the use position, the control link steers the support wheels in the forward direction. In converting the implement for transport, an hydraulic cylinder actuated by the operator from the tractor, uncouples a portion of the hitch assembly and permits the control link to rotate as the tractor is driven to the side of the carrier frame. In thus rotating, the control link actuates the steering mechanism to turn the support wheels so that they all face the side and are aligned with the tractor which transports the implement from the side, parallel to the direction of elongation of the carrier frame. As the tractor turns during transport, the control link and steering mechanism steers to support wheels.

27 Claims, 37 Drawing Figures

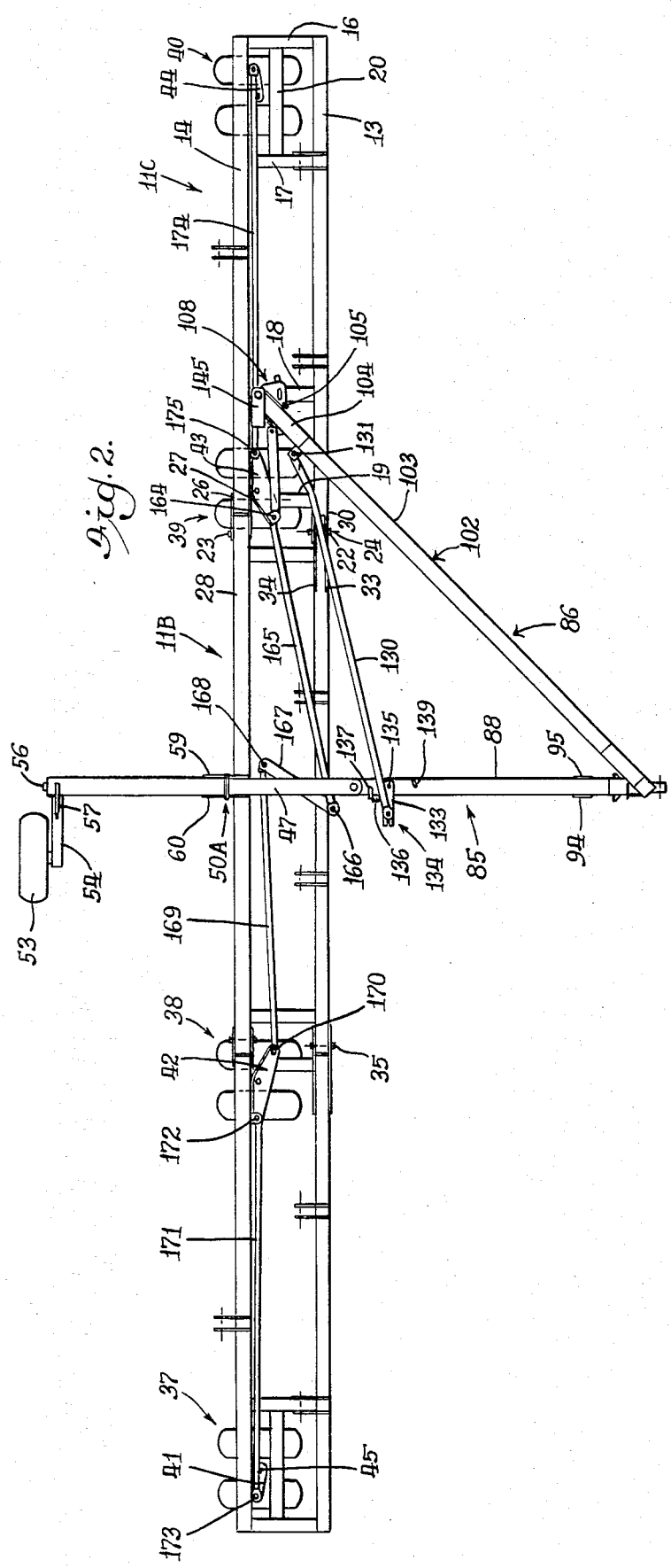
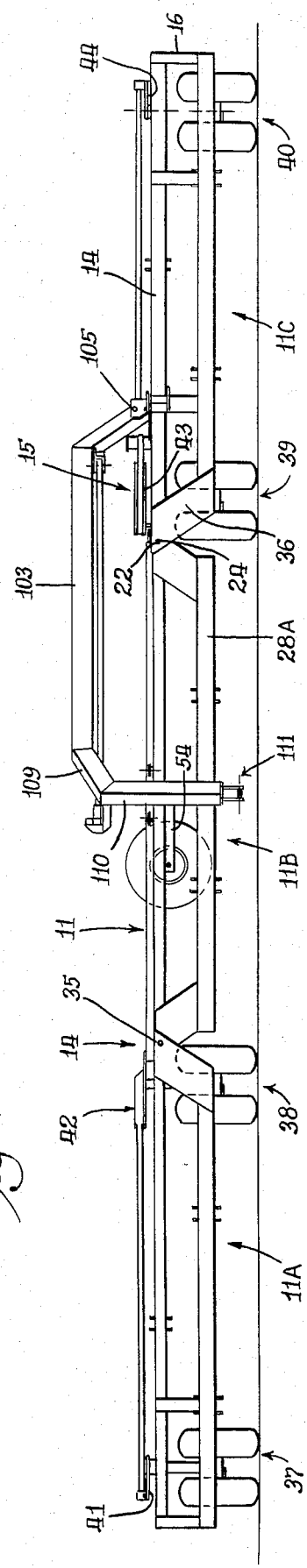

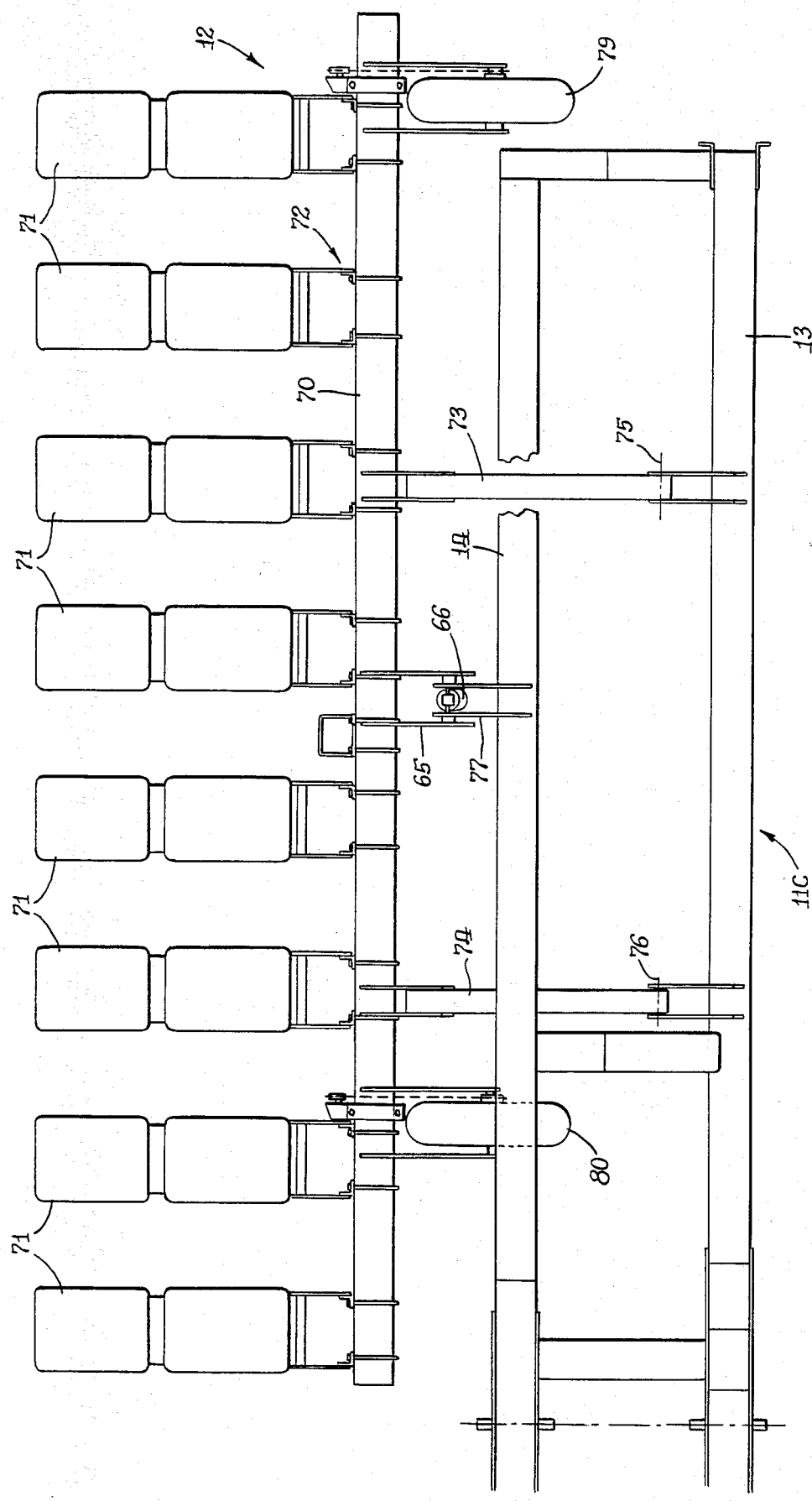

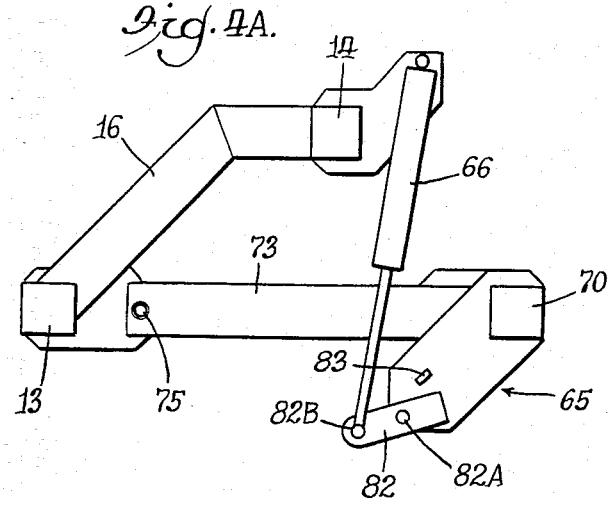
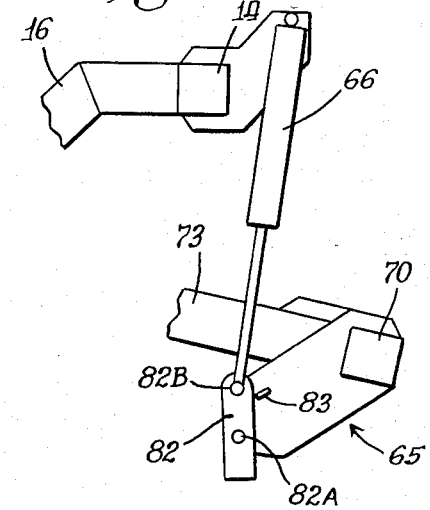
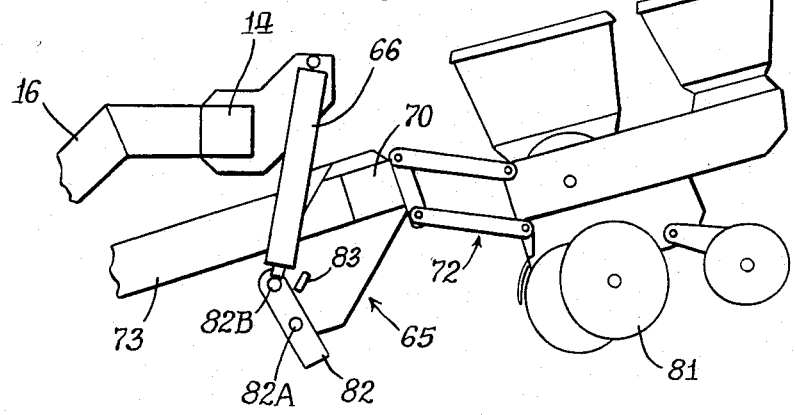
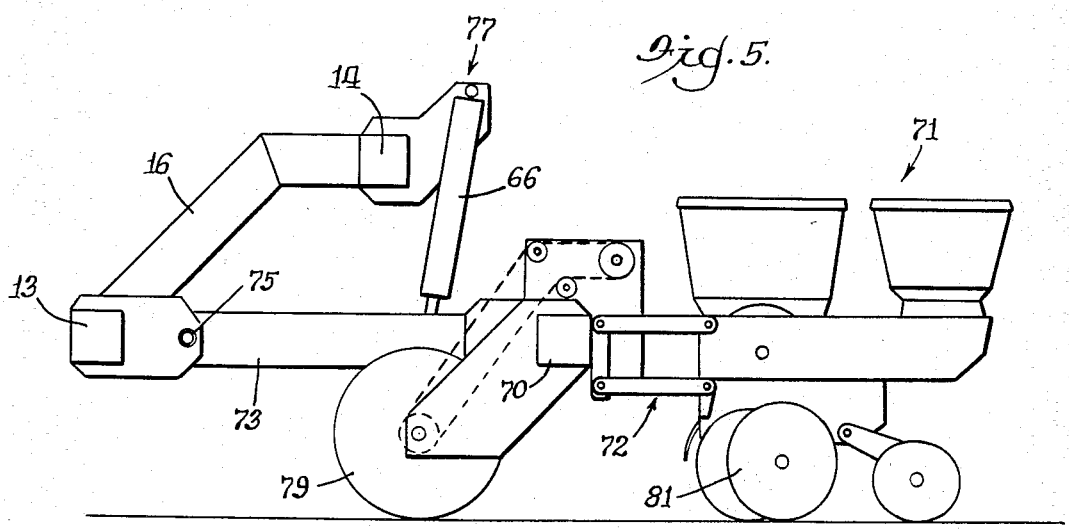

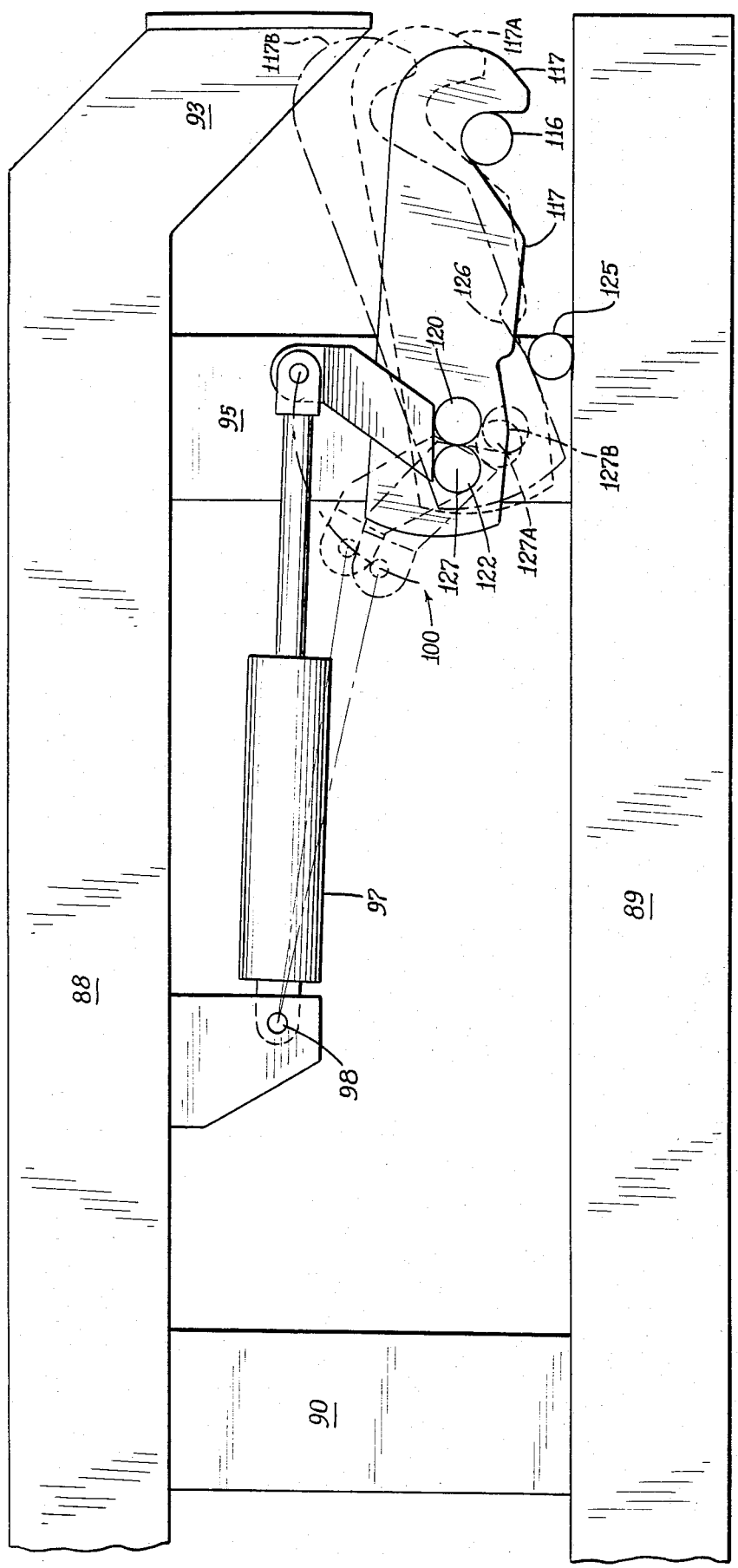
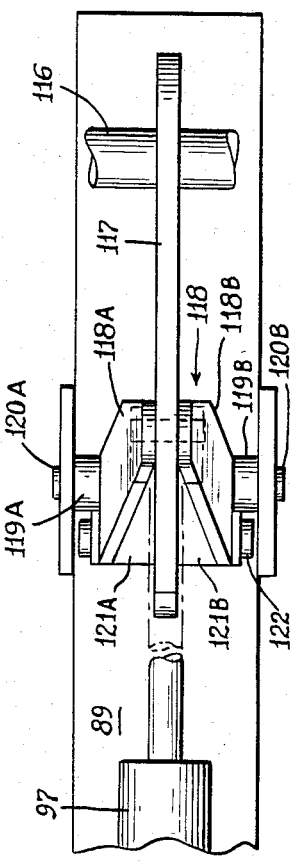
Fig. 6.
Fig. 7.

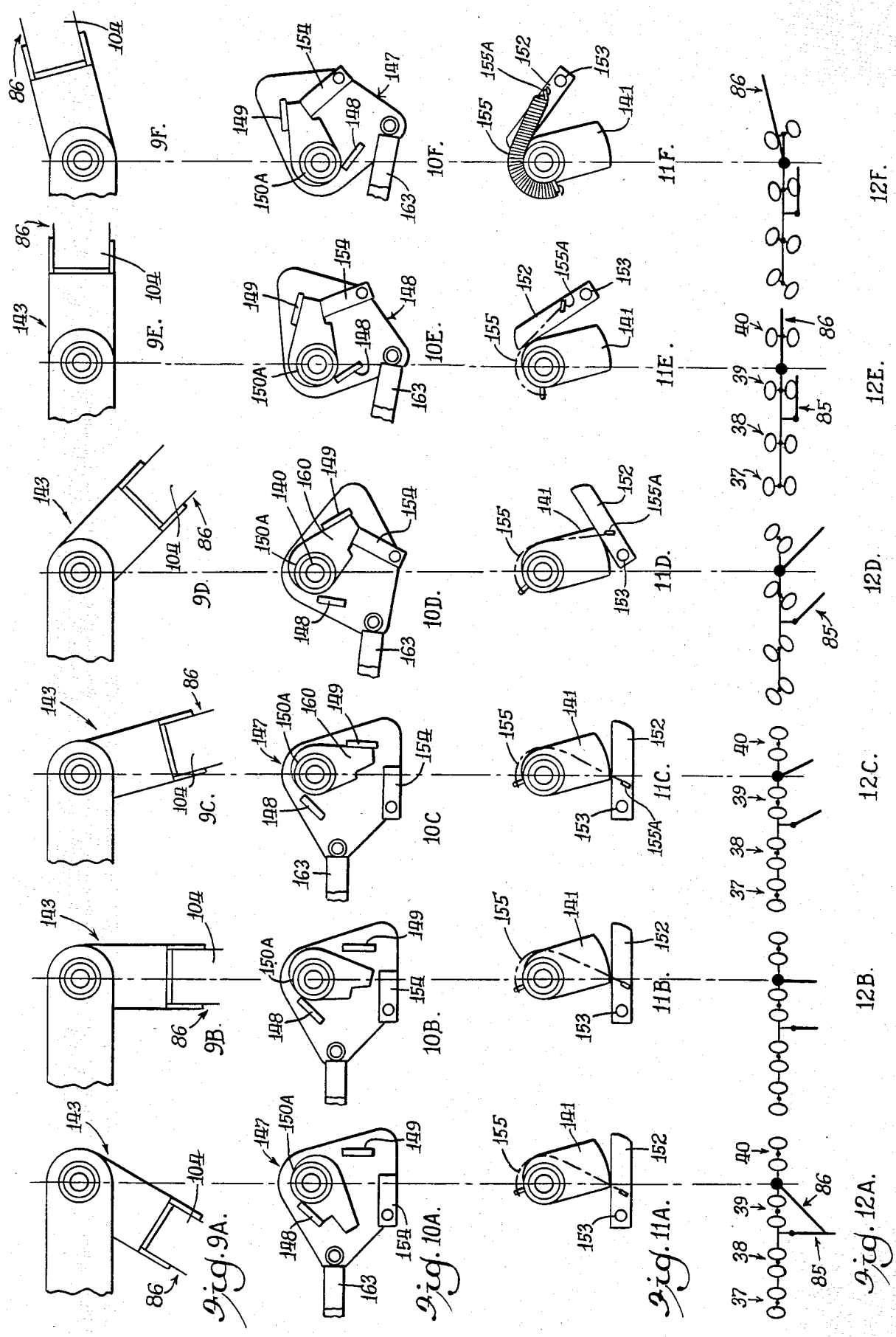

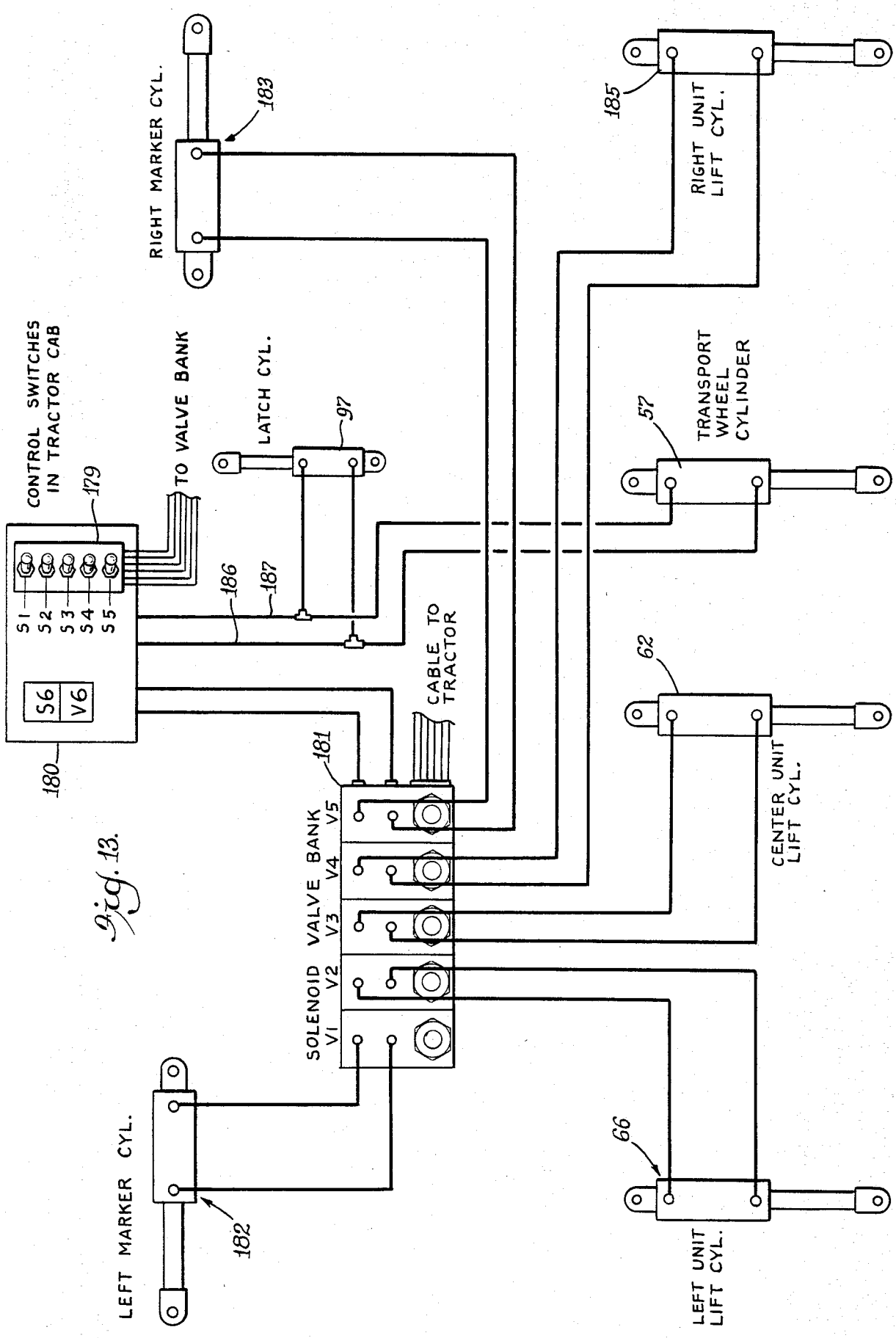

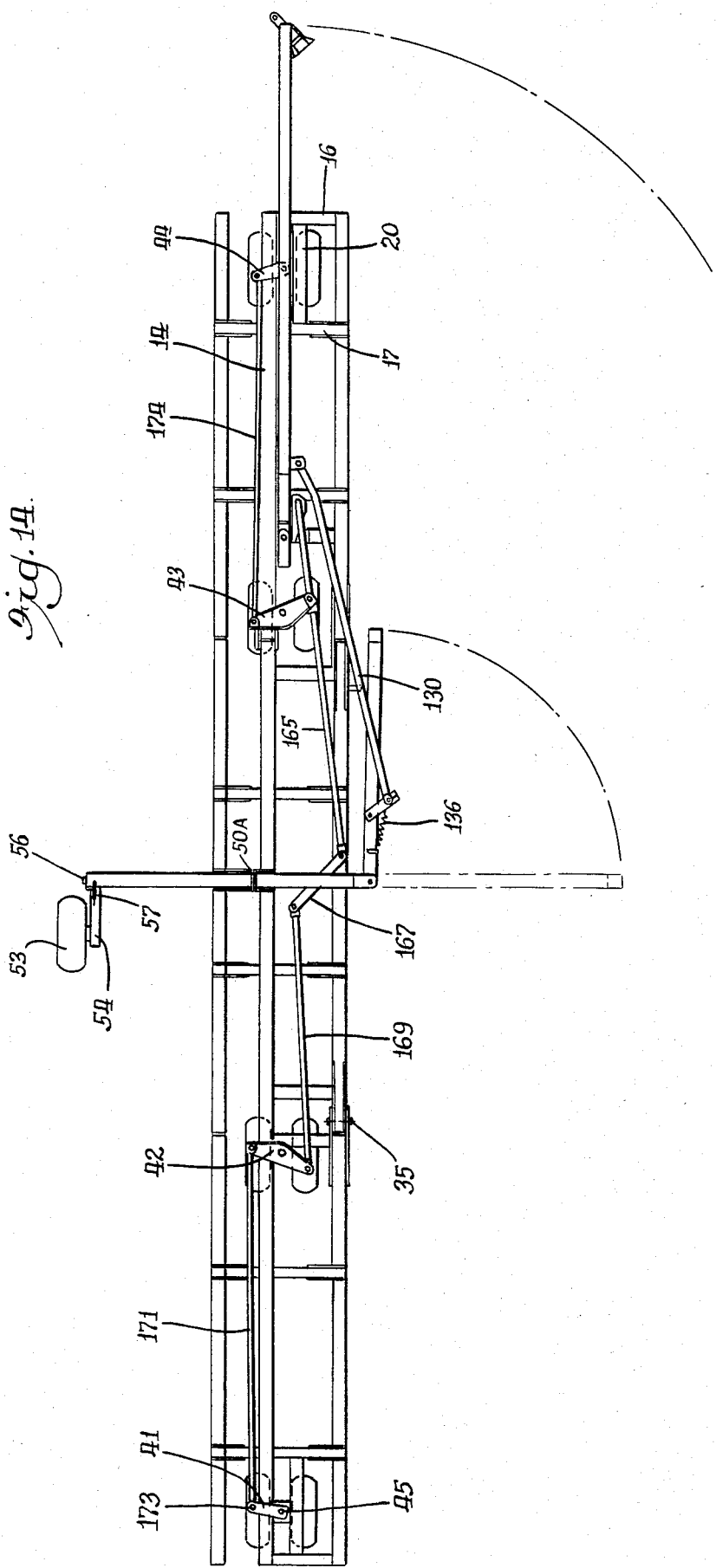

AGRICULTURAL IMPLEMENT CONVERTIBLE BETWEEN USE AND TRANSPORT POSITIONS

BACKGROUND AND SUMMARY

The present invention relates to agricultural implements, and particularly to larger agricultural implements adapted to be pulled behind modern tractors and which take advantage of the larger horsepower of such tractors and are therefore quite wide in use. By way of example, the invention is described in the embodiment of a planter having 24 or more individual planter row units and which will extend 75 feet or more in use.

One important consideration of such large implements is the mode and manner in which it is transported. Obviously, such an implement cannot be transported to and from the field over roads in the same position or configuration in which it is set up for field use. Some early planters required separate transport trailers. In addition to the cost for the special-use transport trailers, such systems were limited in length by the practical requirements of having to load the implement on the trailer and to unload it. In addition, considerable time is consumed in loading the implement on the trailer to transport it to a second field, and to then set up the implement in the new field. This time can be considerable especially when related to the short time normally available when good planting conditions prevail.

Other attempts to provide larger implements included folding vertically the outer ends of the frame or bar on which the row units are mounted. These structures may be acceptable for cultivators and the like, but there is a limitation on the height of the implement for getting it through gates and into sheds. In the case of a planter, these implements have the disadvantage that the lids of the hoppers turned on their sides may come loose thereby spilling seed or insecticide. Other folding configurations include one which folds the outer portions of the mounting bar rearwardly, leaving the center portion fixed. Again, limitations are imposed on the length of these implements and there are disadvantages in converting them between use and transport conditions.

A significant improvement in planter design was effected by the system disclosed in my U.S. Pat. No. 4,117,893. This system which has proved commercially successful, permits the planter bar to fold about its centerline, and links are used to lock the two side sections or wings either in the use position in which the mounting bars are aligned and transverse of the direction of travel of the tractor, or in the transport position, in which the mounting bars for the two sets of row units are folded rearwardly and are parallel to the direction of travel of the tractor. This system proved successful because it was capable of being converted between the use and transport position by a single operator without having to leave the tractor, and because it enabled planters of 16 or 18 and even 24 row configurations to be designed. Such larger planters are desirable, particularly by operators of larger acreage where, as mentioned, the time during which ideal planting conditions exist, is short.

Another folding tool bar is disclosed in U.S. Pat. No. 4,137,852, in which the center section of the planter bar remains fixed in both the transport and use configurations, but the end sections fold forwardly by means of an hydraulic mechanism. This system has the disadvantage that the draught or tongue section of the implement is required to be very long to accomodate the forwardly-folding planter bar sections, but in use, the length of the tongue section becomes a disadvantage because it reduces the ability of the operator to maneuver the combination of tractor and implement.

The present invention presents a uniquely different approach to a large implement by permitting the main frame to be "rigid" in the sense that it does not fold for transport, but is provided in articulated sections to flex in order to follow ground contour). The implement is transported from the side. This is accomplished by a hitch structure having two draught members or tongues which are pivotally connected to the main frame which is sometimes referred to as a "carrier" because the tool sections are supported by it. One of the draught members (sometimes referred to as a control link) is connected to the tractor hitch, and it remains connected to the tractor hitch in the use position, the transport position, and intermediate positions when the implement is being converted between use and transport.

In the use position, the forward end of the other draught member is locked to the forward end of the control draught member to form a rigid triangle with the carrier frame, thereby maintaining the carrier frame transverse of the direction of travel of the tractor in the desired use position.

When it is desired to convert the implement to the transport position, the operator actuates a hydraulic cylinder from his station on the tractor, and the cylinder unlocks the second draught member from the control draught member so that the second draught member is free to pivot. The operator then drives the tractor around to the side of the implement, preferably the left side of the implement so that any commodity or supply transported by the forward part of the carrier frame during use will overhang the shoulder of the road during transport and not interfere with oncoming traffic. As the tractor moves from the front of the implement frame to the side, it rotates the control draught member to control the steering mechanism for the support wheels of the implement. This control member thus has two functions, one of which is to transmit force from the tractor to the carrier frame in both the use position and the transport position, and its other function is to control the steering of the support wheels.

In use, the steering mechanis steers the carrier frame support wheels in the forward direction. As the control draught member is rotated to the side to convert the implement for road travel, it rotates the support wheels 90° so that they now face to the side. The same wheels are thus used to transport the carrier frame over the road as were used to support it in field use. Further, in transport, the same steering linkages are responsive to the turning of the tractor which, in turn, rotates the control link, to steer the support wheels to provide great maneuverability for such a large implement. The forward support wheels are steered in the direction the tractor turns, whereas the rear support wheels (the right side support wheels in the use position) are steered in a counter direction to bring the right end of the carrier frame around the turn.

As used herein, the term "front" refers to the front of the implement as it is set up for use and facing the direction of travel of the tractor. Similarly, the left and right sides of the implement correspond to the left and right sides of a viewer looking in the direction of travel. These conventions are not changed even though the implement may be set up for transport. Thus, the left side of the implement in transport is still referred to as the left side, not the "front" even though it precedes the right side of the implement of the illustrated embodiment when it is being transported.

In the illustrated embodiment, a very large planter is disclosed having four sets of dual wheels for supporting the implement. Two sets of dual wheels support the left side of the implement and two sets support the right side. There is also a transport wheel mounted to the rear of the frame, and it is lowered for transport. The transport wheel is not a steerable wheel so that in the transport mode, the entire implement pivots about the transport wheel as the tractor turns. Moreover, in the illustrated embodiment, the outboard sets of steerable wheels are turned at greater angular displacements than are the inboard sets to facilitate maneuvering the very large implement.

Another consideration of large implements of this type is the cost involved in manufacturing the main carrier frame. There is a desire to make the main frame heavy, particularly in the case of ground working tools so that that weight can be transferred from the frame to the tools during working. However, weight and bulk add expense, and in conventional designs where each large implement has its own frame, adding weight to the main frame has the disadvantage of adding cost to each implement. By providing separate frames for each large implement, the cost increase is exacerbated since many items such as support wheels, folding and transport mechanisms, hitch assemblies, hydraulic lines and controls, and so on, are actually duplicated. Thus, the overall expense to the farmer is ultimately increased greatly.

The present invention provides a large carrier frame which can be made, and in fact is, quite massive. Because of the size of the frame, it is provided in separate sections with adjacent sections connected to each other so that they can pivot about a horizontal axis parallel to the direction of travel of the vehicle. This enables the implement frame to flex and to follow more closely the contour of the ground.

For each carrier frame section, there is provided a corresponding tool section or subframe on which the tools are mounted. This subframe establishes the lateral spacing and operating depth of the tools. Each tool subframe is mounted to its associated main carrier frame section by two forward pivots and an hydraulic cylinder similar to the three-point hitch on a tractor. The hydraulic cylinder may be actuated from the operator's station to separately lift the entire tool section independently of other tool sections. This feature facilitates the working of point rows. Further, in the case of a planter, the subframe also carries the drive pick-up wheel which supplies drive power to the meters of the individual planter row units. By lifting the entire planter subframe, the drive wheels are also raised so there is no need to disengage the drive in converting the system to the transport position or in turning around in the field. In prior systems, the meter drive wheels have been mounted to a single main frame, thereby requiring either that the meter drives be disengaged or that the main frame be raised for transport.

Each tool section further has its own depth gauge means which, in the case of a planter, is provided in the row units themselves. Thus, the carrier main frame does not have to have hydraulic cylinders for raising it. It can remain at a fixed height. Any hydraulic cylinders for raising the main frame would be quite large and therefore expensive. The carrier frame can also be used to store centrally large quantities of commodities or supplies which need not be raised. Further, each tool section can be replaced by a different tool section for performing a separate function. Thus, the carrier frame and its attendant structure, support wheels, hydraulic controls, and the like, can be used for different farming functions, such as planting, cultivating, chisel plowing, fertilizer application, spraying herbicide, and many others. The individual tool sections can be stored in a smaller space.

Other features and advantages of the present invention will be readily apparent to persons skilled in the art from the following detailed description of a preferred embodiment accompanied by the attached drawing wherein identical reference numerals will refer to like parts of the various views.

DESCRIPTION OF THE DRAWINGS

FIG. 1 is a front elevational view of a carrier frame incorporating the present invention;

FIG. 2 is a plan view of the carrier frame of FIG. 1 set up in the use position;

FIG. 2A is a plan view of the left section of the carrier frame of FIG. 2 and including a planter tool section;

FIGS. 4A–4C are fragmentary side views illustrating raising and lowering of the tool section;

FIG. 5 is a diagrammatic side view of the carrier frame and an individual tool section showing the tool section in the use position;

FIG. 6 is a close-up right side view of the locking mechanism for coupling the central draught member to the control draught member;

FIG. 7 is a plan view of the structure shown in FIG. 6;

FIGS. 9A–9F illustrate a sequence of rotation of the gooseneck or control draught member between the use and transport position;

FIGS. 10A–10F illustrate the operation of the steering control mechanism and programmer for the sequence of positions shown in FIGS. 9A–9F respectively;

FIGS. 11A–11F illustrate the operation of the latching mechanism for the control plate of the programmer for the various positions of the programmer shown in FIGS. 10A–10F respectively;

FIGS. 12A–12F are diagrammatic illustrations showing the positions of the hitch draught members and the corresponding positions of the dual support wheel assemblies for the various positions of the control draught member shown in FIGS. 9A–9F;

FIG. 13 is a schematic diagram illustrating the hydraulic system for the apparatus shown in FIG. 1; and FIG. 14 is a plan view similar to FIG. 2 but with the apparatus in the transport position.

DESCRIPTION OF THE ILLUSTRATED EMOBDIMENT

Figure 3:
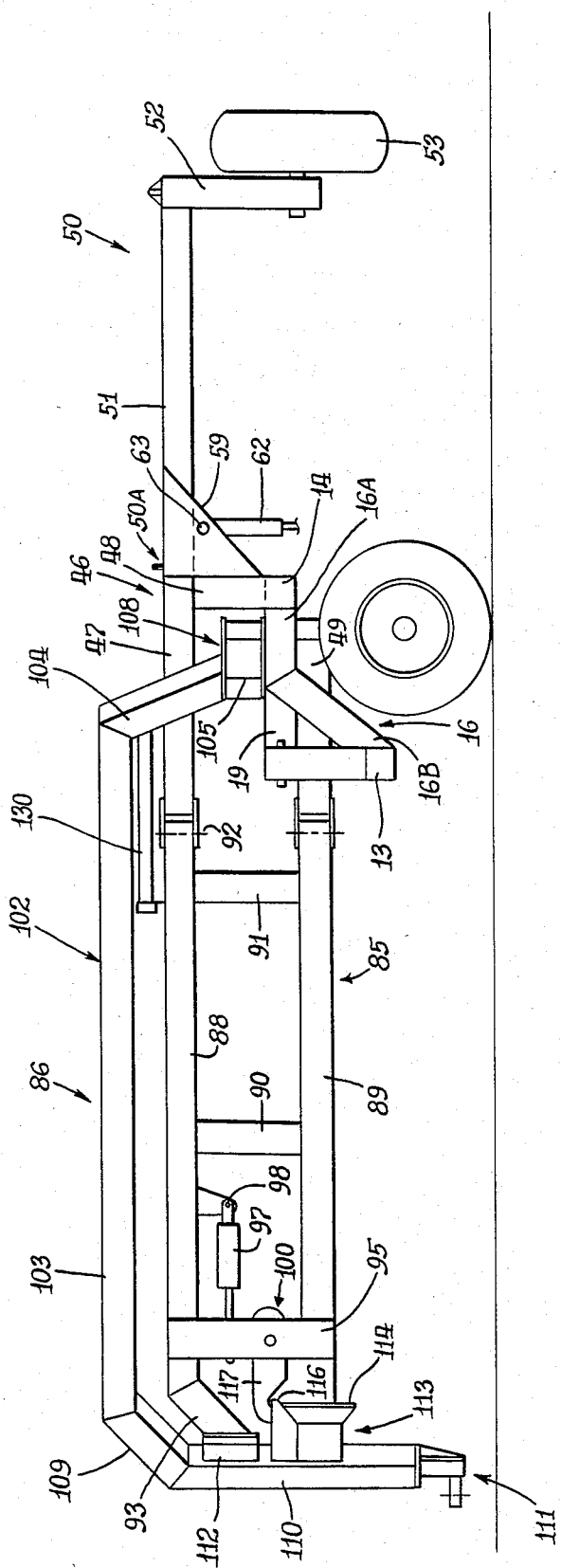
FIG. 3 is a side view of the apparatus of FIG. 2 taken from the right side of FIG. 2 (the left side of the implement)

Referring first to FIGS. 1 and 2, the apparatus comprises a hitch generally designated 10, a main or carrier frame 11 and a plurality of implement sections, one of which is shown in FIG. 3, generally designated 12. In the illustrated embodiment, the carrier frame is provided in three sections including a right side section 11A, a center section 11B, and a left side section 11C. The terms "right" and "left" refer to directions when looking in the direction of travel of the tractor, as is conventional.

The center section 11B of the carrier frame is pivotally connected to the right side section 11A at 14; and the center section is similarly pivotally connected to the left side section 11C at a location designated 15 in FIG. 1. These pivotal connections will be described in more detail below, but the reason for these connections is that the three sections are thus articulated to permit the carrier frame to follow ground contour. However, this is not necessary to the practice of the invention since for a smaller implement, the carrier frame could be rigid. For an articulated carrier frame such as that illustrated, each section has associated with it its own tool section. Thus, as seen in FIG. 2A, for example a complete 8-row planter section 12 is carried by the left side carrier frame section 11C.

Persons skilled in the art will readily appreciate that whereas the illustrated embodiment discloses the use of planter row units mounted in sections, with a separate tool mounting bar or subframe for each planter section, the invention is not limited to that application. To the contrary, it is recognized that the invention has much broader application as a carrier frame for tillage units such as disc or chisel plows, cultivators, fertilizer applicators or sprayers. It is considered a particular advantage of the present invention that the same carrier frame can be used with different tools [and the term "tool" in this connection is intended to have application broader than ground working or engaging tools to include, for example, sprayers]. As will be made clear subsequently, each tool section may have its own tool mounting bar or subframe to maintain proper spacing, for setting working depth and to facilitate storage, etc.; but a tool section may be attached to the main carrier frame as a unit and will be interchangeable with tool sections having tools or applicators for performing a different function.

An important advantage in having a single carrier frame with different tool sections detachably mounted to it is that the same hitch, carrier frame, hydraulic system, transport mechanism, etc. can be used for all the various tool sections. Once the farmer/operator has learned how to set up, operate and maneuver the system, he can use those skills for other farming functions.

The Main Carrier Frame

Referring first to the left side main carrier frame section 11C (it will be understood that the other main carrier frame sections 11A and 11B are similar), it includes a forward bar of tubular metal designated 13 and a rear bar 14. As best seen in FIG. 3, the forward bar 13 is located lower than the rear bar 14; and they are connected by four connecting frame members 16, 17, 18 and 19 to form a rigid carrier frame section. The frame member 16 includes a horizontal portion 16A welded to the front surface of the rear bar 14, and a forwardly and downwardly inclined portion 16B welded to the lower, forward bar 13. The connecting members 17 and 18 are similar in shape to frame member 16, but frame member 19 can be straight, as will be understood from subsequent description. A cross member 20 is connected between the frame members 16 and 17, as illustrated in FIG. 2.

Referring to FIG. 2, the left side of the center carrier frame section 11B is pivotally connected by hinge pins 22, 23 which interconnect respectively the corresponding forward bars and rear bars of those two carrier frame sections, thereby permitting the main frame sections 11B and 11C to hinge or articulate about a horizontal axis designated 24. To accomplish this, a pair of plates 26, 27 are welded to the rear bar 14 of carrier frame section 11C, and extend adjacent the rear bar 28 of center section 11B to provide apertures for receiving the hinge pin 23 which is fitted through a sleeve bearing in the rear bar 28.

The forward bar 13 of the left carrier frame section 11C is similarly provided with first and second plates 30, 31 located respectively fore and aft of the bar 13 and extending upwardly (see the plate 30 in FIG. 1) approximately to the level of the upper surface of the rear bar 14. Similar plates 33, 34 are welded to the upper surface of the forward bar 28A of the center carrier frame section 11B. The hinge pin 22 is received in aligned apertures in the plates 30, 31, 33 and 34 in a manner such that its pivot axis aligns with the pivot axis of the rear hinge pin 23, thereby permitting the carrier frame sections to pivot about a common axis 24. The right side carrier frame section 11A is similarly connected to the right side of the center carrier frame section 11B to permit pivotal action about an axis designated 35 in FIG. 1.

The carrier frame in the illustrated embodiment is supported by four sets of dual wheels designated respectively in FIG. 1 as 37, 38, 39 and 40. Each of the dual wheel assemblies 37–40 is connected to an associated steering arm designated 41–44 respectively.

The dual wheel assemblies are all controlled by a common steering mechanism which will be described in detail below; but it will be understood that when the system is set up for use, all of the dual wheel assemblies are aligned in the direction of travel of the tractor. When the tractor moves to the side of the implement, to convert it to the road travel or transport position, the dual wheel assemblies are all turned to face the left-right direction as seen in FIG. 14 (i.e. they are parallel to the direction of elongation of the carrier frame); and in that position, the steering mechanism is actuated to steer the dual wheel assemblies in response to the turning of the tractor. This will be better understood in connection with the description of FIGS. 9A–9F through 12A–12F and after the complete carrier structure has been described.

Turning now to FIG. 3, and particularly the center carrier frame section 11B, an upright C-shaped frame portion 46 includes an upper horizontal frame member 47 welded at its rear to a vertical frame member 48 (the lower portion of which is in turn welded to the previously described rear frame member 14 of the center section), and a lower horizontal frame member 49, which is beneath the upper frame member 47. The frame member 49 is welded to the lower surface of the rear frame member 14, thereby forming the forwardly-extending C-shaped frame section 46.

Transport Wheel Assembly

A transport wheel assembly support wheel assembly 50 is bolted to the upright portion of the C-shaped frame section 46 as at 50A in FIG. 3, and it includes a rearwardly-extending member 51, a downwardly-extending member 52, and a support wheel 53 mounted to the downwardly-extending frame member by a laterally projecting arm 54 (see FIG. 2). The wheel 53 extends in the side-to-side direction of the carrier and does not caster and is not steered. When it is lowered, it acts to stabilize the apparatus in the road-travel or transport position, and it also acts as a pivot for turning the entire implement when the tractor turns. The arm 54 is pivotally connected to the upright member 52 as at 56 in FIG. 2. An hydraulic cylinder 57 is connected between the upright member 52 and the horizontal arm 54. When the cylinder 57 is extended, it lowers the stabilizing transport wheel 53 to the transport position. When retracted, the cylinder 57 raises the wheel 53.

Still referring to the transport wheel assembly 50, as seen in FIG. 3, the rearwardly-extending frame member 51 is supported and braced against the C-shaped upright frame section 46 by means of a pair of triangular brace plates, one of which is shown at 59 (the other being designated 60 and seen from the top in FIG. 2). The plates 59, 60 provide a mounting means for a lift cylinder 62, for the center tool section and its frame. The cylinder 62 has its butt end pivotally connected at 63 to the plates 59, 60, and its rod end pivotally connected to an attaching member located at the central forward portion of the associated tool or implement section (see the cylinder mount designated 65 for the side section cylinder 66 in FIG. 4).

Description of A Tool Section

Referring now to FIG. 2A, an implement or tool section 12 comprising a plurality of planter row units will be described, but as mentioned above, persons skilled in the art will readily appreciate that other ground-engaging tools or tools which do not necessarily engage the ground (such as sprayers) may equally well be adapted for placement on an implement subframe and incorporated into the present invention. The tool sections associated respectively with the right side carrier frame section 11A and the center carrier frame section 11B, may be similar in structure and operation to that shown in FIG. 2A; and they therefore need not be disclosed in further detail.

Turning then to the tool section 12, it includes a horizontal tool mounting bar 70 to which a plurality of conventional planter row units 71 are mounted by conventional four-bar linkages 72.

Extending forwardly of the mounting bar 70 are two rigid links 73, 74; and they are pivotally attached at their respective front end to pivot plates attached to the horizontal frame member 13 of the main carrier frame, the respective pivot axes being aligned and designated 75 and 76 in FIG. 2A. The mounting bar and links 73, 74 form a tool section subframe.

The previously described cylinder mount 65 is located at the center of the mounting bar 70 as seen in FIG. 2A; and the upper or butt end of the cylinder 66 is pivotally attached to a similar cylinder mount 77 welded to the upper rear bar 14 of the carrier frame section 11C.

Still referring to FIG. 2A, the tool section 12 is provided with first and second drive wheels 79, 80 which, in the case of the tool's being conventional planter row units, are used to provide drive to the metering units of the row units. In other words, the wheels 79, 80 are not in this embodiment depth-gauging wheels—rather, the depth gauging is separately provided by gauge wheels of the individual row units shown at 81 in FIG. 4C. In other applications, it will be appreciated by those skilled in the art, the tool mounting bar 70 could be of a different configuration, such as a box frame in the case of field cultivators, and it could be equipped with its own depth-gauging wheels in the use position. In other words, the apparatus being described is believed to be broadly versatile in application. However, one advantage of the system when it is used as a planter is that the drive pick-up wheels for the planter row units can be mounted to and lifted with the tool section as a unit. Thus, a clutch does not have to be disengaged when the system is turned around at the end of a field or when one section only is lifted to plant point rows.

In operation, when the cylinder 66 is retracted, the tool section 12 is raised, the links 73, 74 being pivoted counterclockwise (when viewed from the left) about their respective axes 75, 76; and the mounting bar 70 thereby being lifted, as illustrated, in the raised position in FIG. 4C.

Referring now to FIGS. 4A–4C, and 5, the structure for lifting a tool section from the working position (FIG. 5) to the transport position (FIG. 4C) will be described. A link 82 is pivotally connected at 82A to the hitch mount 65 between the hydraulic cylinder 66 and the tool mounting bar 70, the rod end of the cylinder 66 being pivotally connected to the distal end of the link 82 at 82B. The hitch mount 65 is provided with a stop member 83 to limit the clockwise rotation of the link 82 during lifting by engaging the free end 84 of the link. The purpose of the link 82 is to permit the implement section to float freely of the cylinder 66 in the lowered or use position, the limit being illustrated in FIG. 4B.

Comparing FIGS. 4A–4C, when the cylinder 66 is extended as shown in FIG. 4A, the tool mounting bar 70 is shown in the lowered or use position, and the draft link 73 is in a generally horizontal position. The tool section is free to rotate about the pivot pins 75, 76 to follow ground contour as illustrated in fragmentary form in FIG. 4B. It will be observed that each tool section is mounted for rotation about its own horizontal axis independently of the other tool sections, while each individual unit or tool is mounted for further independent vertical movement to follow ground contour by virtue of its four-bar linkage mount. At the same time, the main carrier frame is articulated for flexing, but need not be raised or lowered between the use and transport positions, thereby providing a stable platform for any sensing instruments or commodities such as fertilizer carried by it.

When the tool section is in the use or working position and the cylinder 66 is retracted, the link 82 is rotated clockwise from the position shown in FIG. 4A until it engages the stop 83 of the cylinder mount 65. Further retraction of the cylinder 66 causes the entire tool section, including the row units 71, to be raised by rotating the main draft links 73, 74 in a counterclockwise direction about pivots 75, 76 to the position shown in FIG. 4C. It will also be observed from FIG. 4A that should the ground contour elevate from that shown in FIG. 4A, the tool section and mounting bar 70 may rise relative to the position shown in FIG. 4A since the link 82 allows some play before the rear extension of link 82 engages the stop 83. Thus, the mechanism for elevating the tool sections includes some lost motion permitting the tool section to follow both depressions and elevations in the contour of the ground during use.

As mentioned, during the raising of the tool sections to the transport position, the carrier frame does not rise. Rather, there is no necessity in the illustrated embodiment of having any mechanism for raising the main carrier frame 11 relative to the ground in the use position, the road position, or any intermediate position. This is considered a primary advantage of the invention because it requires less hydraulic power (and obviously avoids the use of large hydraulic cylinders) to operate because the mass of the main carrier frame is so great. Likewise, the materials in the carrier frame can be heavier without the disadvantage of requiring an hydraulic system of larger capacity. Operation of the conversion between the use position and the transport position is quicker. Further, operation of the entire implement in the transport position is safer because it cannot "fall"—as could otherwise be occasioned by loosing hydraulic power, for example. By enabling the frame to be larger and more massive, it is better able to carry more seed, fertilizer, etc. than it otherwise would be able to do.

Hitch Assembly

Returning now to FIG. 2, the hitch assembly includes a center draught section generally designated 85, and a gooseneck assembly generally designated 86. The gooseneck assembly is at times referred to as a control member or control draught member.

As seen best in FIG. 3, the center draught section 85 includes upper and lower frame members 88, 89 which are braced by vertical frame members 90, 91 to form a rigid frame section which matches with and couples to the center C-shaped frame section 46 previously described which, it will be recalled, is rigidly secured to the main carrier frame and forms an integral part thereof. However, the center draught assembly 85 is mounted for rotation about a vertical axis 92 by pivotally connecting frame member 88 of the drawbar assembly 85 to the forwardly projecting frame member 47 of the C-frame section 46; and by similarly pivotally connecting frame member 89 to frame member 49 of the respective sections. The forward portions of the horizontal frame members 88, 89 are also connected by vertical side plates 94, 95.

An hydraulic cylinder 97 (called the "latch" cylinder) is pivotally connected at 98 to a cylinder mount projecting from the previously described frame member 88 on the center draught assembly 85. The rod end of the latch cylinder is connected to and actuates a locking mechanism generally designated 100. In general, the locking mechanism 100 couples the center draught assembly 85 to the gooseneck assembly 86 in the use position so that both assemblies cooperate to form a draught assembly which maintains the carrier frame transverse of the direction of travel of the implement while permitting some flexing to avoid binding that might result in bending or breakage. When the latch cylinder 97 is retracted, the latch mechanism 100 unlatches the center drawbar assembly from the gooseneck assembly to permit the hitch apparatus to be converted to transport position.

Referring particularly to FIG. 3, the gooseneck assembly 86 is seen to include an integral, rigid gooseneck bar 102 having an elongated horizontal section 103, a downwardly inclined rear section 104 which has its lower end pivotally connected as at 105 to a steering actuation mechnism generally designated 108. As will be further explained in detail below, the gooseneck bar 102 is permitted to pivot about the horizontal axis 105 (FIG. 2) in the road travel position. The purpose of this is so that as the implement traverses hilly terrain the weight of the implement is not transferred to the tractor hitch. In the use position, however, the main carrier frame 11, gooseneck assembly 86 and center draught assembly 85 form a rigid triangular structure maintaining the main carrier frame in a direction transverse to the direction of travel of the implement, permitting the individual carrier frame sections to flex and follow the contour of the ground.

As best seen in FIG. 1, the forward portion of the gooseneck bar 102 includes a downwardly and forwardly inclined member 109 from the forward end of which depends a vertical member 110. A tractor hitch 111 is provided at the lower portion of the member 110 to connect to the tractor drawbar.

At the upper rear portion of the vertical member 110, there is a mounted a stop plate 112 which engages and limits the forward portion of the member 93 of the center draught assembly 85. Further, a receptacle generally designated 113 is welded beneath the stop plate 112, and it includes a funnel-shaped guide 114, the function of which is to guide the forward end of the member 89 of the center draught section 85 into the receptacle 113. A latch rod 116 (FIG. 6) is rigidly connected to the upright member 110 of the gooseneck bar 102; and receives a latch member 117 of the latch mechanism 100. When the latch mechanism 100 is in the latching position, it draws the forward portion of the member 93 against the stop 112, and it also locates the forward portion of member 89 in the receptacle 113. Thus, the center draught assembly 85 is latched against fore and aft movement relative to the gooseneck assembly 86. However, the two assemblies are permitted to move slightly relative to one another in a vertical plane transverse of the direction of travel of the tractor to permit flexure under use conditions.

Referring now to both FIGS. 6 and 7, the rod end of the latch cylinder 97 is pivotally connected to a crank member 118 having inclined side plates 118A, 118B, which are welded respectively to sleeves 119A, 119B which are journaled on fixed pins or stub shafts 120A, 120B respectively. The plates 118A and 118B are welded respectively to sleeves 121A and 121B having their bores aligned to form a journal for a pin 122. The hook 117 is rotatably mounted to the pin 122 between the sleeves 121A and 121B.

A cam member 125 in the form of a rod is welded as seen in FIG. 6 to the upper surface of the frame element 89; and the lower portion of the hook 117 is provided with a cam surface 126, the function of which will be described presently.

When the latch cylinder 97 is retracted, the crank member 118 is rotated counterclockwise in FIG. 6 about the axis of pin 120, thereby displacing the axis of pin 122 from the position shown at 127 to that designated 127A. When pin 122 rotates to the lower, forward position, the hook 117 is forced forwardly and progressively upwardly as the surface 126 rides along the cam 125. This causes the hook member 117 to disengage the latch pin 116 in a forward, upward motion as illustrated in the drawing by the position shown at 117, 117A and 117B for the latch member. Conversely, when the cylinder 97 is extended, the motion of hook 117 is reversed; and the forward portion of frame member 93 on the center drawbar assembly is drawn against the previously described stop member 112 on the vertical member 110 of the gooseneck bar 102, and the forward portion of frame member 89 on the center drawbar assembly is drawn into the receptacle 113.

In the latched position, the axis 127 of the pin 122 is located above a plane defined by the axis of the pin 120 and the axis of latch pin 116 so that it is in an "overcenter" position relative to the two fixed latch points, so that even if power were lost to the hydraulic cylinder 97, the latch mechanism 100 would remain locked, providing a safety feature of the apparatus. The forward portion of the cam surface 126 is located so as to avoid interference with the cam 125, and the shape and location of the cam surface 126 is designed to achieve the proper latching and unlatching motion, as described.

Returning to FIG. 2, a guide link 130 is connected for universal movement at 131 to a laterally extending flange or tab 132 on the gooseneck link 102, and pivotally connected at its other end to an extension link 133 as at 134. The other end of the link 133 is pivotally conected at 135 to the upper surface of the tubular frame member 88 of the center drawbar assembly 85.

Extension link 133 is biased by means of a spring 136, the other end of which is connected at 137 to the center draught asembly 85, for rotation in a clockwise direction as viewed in FIG. 2. A stop member 139 is welded to the upper surface of the frame member 103 to limit the counterclockwise rotation of the extension link 88 about its pivot axis 135, as will be described.

Steering Actuator

Figure 8:
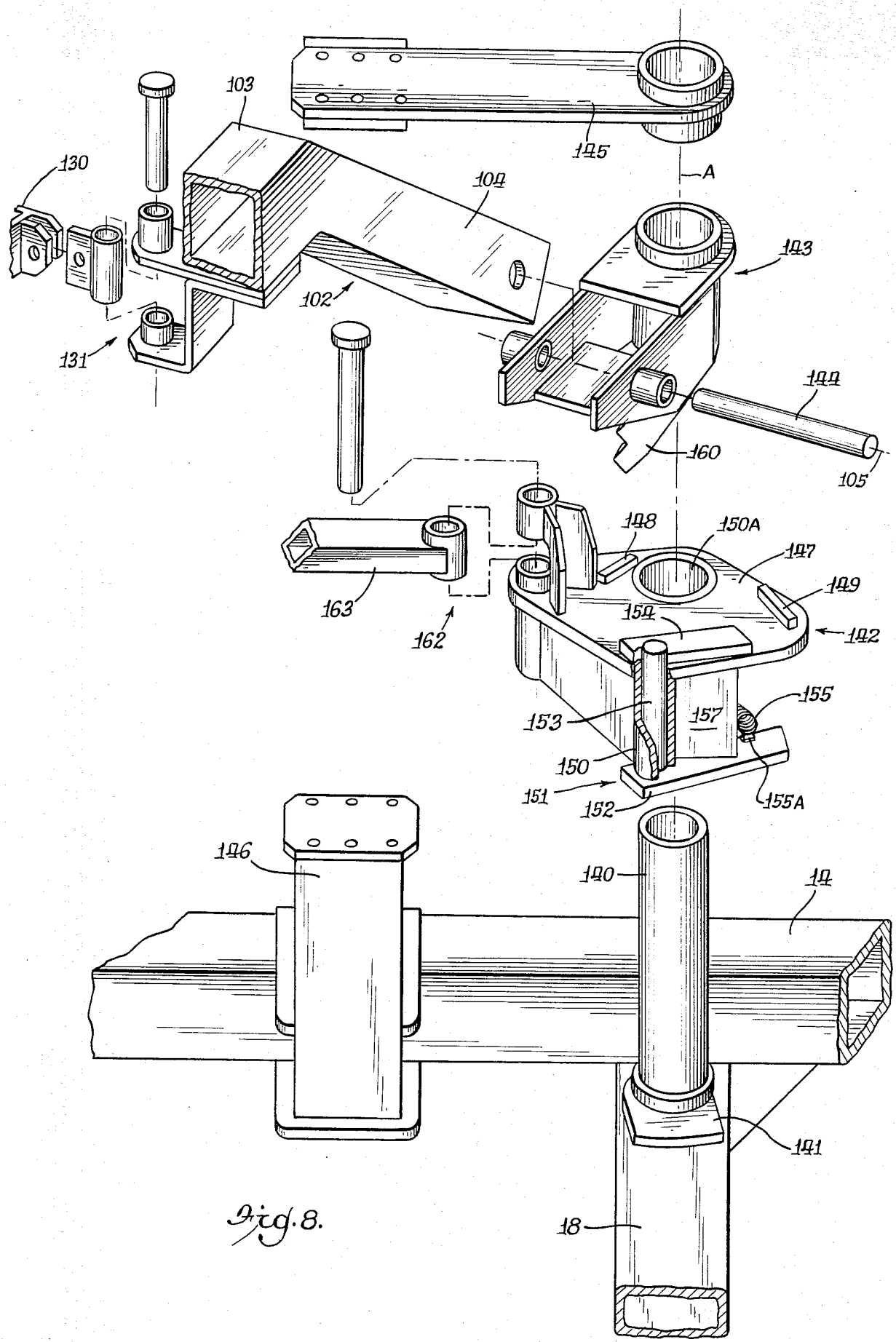
FIG. 8 is an exploded view of the steering control mechanism including the programmer.

Turning now to FIG. 8, the steering actuator mechanism 108 is seen from an upper, frontal perspective with the major elements in exploded relation. It includes a tube 140 connected to the top of the cross-frame member 18 and forming a pivot shaft. The tube 140 is provided at its lower portion with a fixed cam 141. Rotatably received on the tube 140 is a plate assembly 142 called the "programmer".

Also pivotally received on the tube 140 above the programmer 142 is a mount generally designated 143 to which the end portion 104 of the gooseneck tube assembly 102 is connected, by means of a pin 144. The axis of pin 144 defines the previously described rotational axis 105 (see FIG. 3). The principle function of the mount 103 is to provide a rotational mount for the gooseneck tube assembly 102. A cap member 145 fits on the top of the pivot shaft 140, and holds the elements 142 and 143 in assembled relation. The left-hand portion of the cap member 145 is bolted to the top of a support 146 which, in turn, is fixed to the horizontal frame member 114 of the main carrier frame.

The programmer 142 includes a plate 147 on which are mounted first and second stop elements 148, 149. Depending from the plate 147 is a first sleeve 150 in which is journalled a cam follower 151 and a second sleeve 150A which is rotatably received on the pivot shaft 140. The cam follower 151 includes a cam member 152 which is welded to a shaft 153 received in the sleeve 150. The upper portion of the shaft 153 has a latch member 154 secured to it just above the plate 147. A spring 155 is attached to the cam follower 152 at 155A. The spring 155 is wrapped about the tube 150A of the programmer and attached to it at the location designated 156 in FIG. 9A to place the spring 155 in tension and bias the cam follower 152 in counterclockwise rotation. The programmer 142 also includes a stop member 157 which, by abutting the horizontal tube member 14, limits the extent to which the apparatus can be steered to the left, as will be understood.

The pivotal mount 143, in addition to providing a trunnion mount for the pin 144, also includes a lower plate 160 which is located immediately above the upper surface plate 147 of the programer 142 and, as will be described, cooperates with the stops 148, 149 to actuate the steering mechanism when the implement is converted between the use position and the transport position.

The programmer 142 also provides a pivot connection generally designated 162 for a steering link 163.

Returning now to FIG. 2, the steering link 163 is pivotally connected at 164 to the steering arm 43 associated with the dual-wheel assembly 39. A similar steering link 165 is pivotally connected at 164 to the arm 43; and at its other end, it is pivotally connected at 166 to a reversing link 167. The connection 166 is a ball joint connection; and the link 167 is provided with a similar ball joint connection 168 which connects it to a steering link 169, the other end of which is pivotally connected at 170 to the previously described steering arm 42. A steering link 171 is pivotally connected at 172 to the steering arm 42 and at 173 to the previously described steering arm 41.

Still referring to FIG. 2, a steering link 174 is pivotally connected at 175 to the steering arm 43 which controls the dual wheels 39, and the link 174 is pivotally connected at 176 to the steering arm 44 which steers the dual wheels 40.

Operation of the Steering Actuator and Mechanism

Referring now to FIGS. 9A–9F through FIGS. 12A–12F, certain portions of the apparatus are illustrated, sometimes somewhat diagrammatically for clarity, to assist in describing how the steering system operates in the use position and in the transport position, and how it is actuated when the hitch is converted between those two positions. In these drawings, the sequence of operation from the use position to the transport position is viewed by observing the corresponding letter of the figure in its alphabetical sequence. For example, FIG. 12A diagrammatically illustrates the overall implement in the use position, and in following the sequence of FIGS. 12B–12E, the system is ultimately set up for transport, with FIG. 12F illustrating how the steering operates when the implement is set up for transport and the tractor (not shown in FIGS. 12A–12F) makes a left-hand turn.

It will be appreciated, as mentioned above, that when the implement is set up for use, all of the dual wheel assemblies 37 through 40 face or are parallel to the direction of travel of the vehicle, and the gooseneck assembly or control member 86 is locked to the center drawbar assembly 85, both of which are diagrammatically repeated in FIG. 12A. In this position, a rigid triangular brace is formed between the carrier main frame, the gooseneck assembly and the center draught assembly; and the supporting dual wheel assemblies face forward. When the implement is converted, however, to the transport position the dual wheel assemblies are turned to face the direction of elongation of the carrier frame (namely side-to-side, as seen in FIG. 14) and those wheels are steered as a direct function of the steering of the tractor, as will be described in detail in connection with FIGS. 9A–9F presently.

To actuate the steering mechanism, the operator actuates, through the control switches in the tractor cab, a solenoid valve associated with the latch cylinder 97 to cause it to retract. This same valve also causes the transport wheel cylinder 62 to extend, thereby lowering the transport wheel 53 to the ground. Prior to this, the tool sections will have been raised by operating similar control switches and hydraulic circuitry to be described in detail below in the tractor cab. With the latch mechanism thus disengaged (that is, the hook member 117 raised to the position 117B in FIG. 6), the gooseneck assembly 86 is free to rotate about the axis designated A in FIG. 8 of the mount 143. It will be recalled that the plate 160 is an integral part of the gooseneck pivot mount 143, so that as the gooseneck assembly 86 is seen to rotate counterclockwise in the sequence of FIGS. 9A–9F from the use position (FIG. 9A) to the transport position (FIG. 9E), the pivot mount 143 will likewise rotate counterclockwise, as will the plate 160 in the sequence of drawings 10A–10F.

It will be observed that in FIG. 10A, the plate 160 engages the stop member 148 on the programmer plate 147. This is the limit position for the programmer 142 (perhaps best understood in terms of clockwise rotation of the programmer 142 when viewed from the top) and it is characterized in that the steering arm 163 actuates the steering mechanism (including the links 165, 167, 179, 171 and 174 and the dual wheels 37, 38, 39 and 40 and their associated steering arms to set the support dual wheels in the use position as seen in FIG. 2). As will be understood from the following description of the operation of the steering mechanism, the programmer 142 and associated mechanism can be thought of as a control mechanism having an input (namely, the angular or rotational position of the gooseneck assembly or control member 86 as sensed by the rotational position of the plate 160) and an output (namely the steering arm 163 and its connection to plate 147) such that the output or steering is controlled by the programmer as a function of the position of the control member (gooseneck) which, it will be realized, is, in turn, connected to the tractor and therefore a function of the position of the tractor.

To review the status of the steering in the use position, the gooseneck assembly 86 is rigidly connected to the center draught assembly 85 (FIGS. 9A and 12A), and the plate 160 has rotated the programmer 142 to its clockwise limit position through engagement with the limit or stop member 148. The dual wheels face in the direction of travel of the vehicle, as diagrammatically illustrated in FIG. 12A.

To convert the apparatus to the transport position, as indicated, the latch cylinder 97 is actuated to retract, thereby unlatching the hook 117 and permitting the gooseneck assembly 86 to rotate as the operator of the tractor swings the tractor around to the left of the implement. As this occurs, the gooseneck assembly 86 rotates counterclockwise as seen in the progression of drawings 9A–9E. The control plate 160 rotates correspondingly.

As the control plate 160 rotates from the position of FIG. 10A to that of FIG. 10C, the programmer 142 is not rotated so that the dual wheels remain in the use position. The center draught assembly 85 is rotated about the axis 92 (FIG. 3), drawn by the links 130, 133 as the gooseneck assembly 86 is rotated counterclockwise as seen in FIG. 2. One reason for moving the center draught assembly 85 is to reduce the width of the implement for over the road travel, but it also changes the weight distribution of the implement and permits additional weight to be transferred to the transport wheel for greater stability during road travel.

Returning to FIGS. 9A–12F when the gooseneck assembly rotates to the position shown in FIG. 9C and the control plate 160 engages the stop 149, any further rotation of the gooseneck assembly will cause the programmer 142 to rotate with it. This is, in turn, causes the cam follower 152 to rotate relative to the fixed cam 141. The force of spring 155 causes the cam follower 152 to rotate counterclockwise which causes a corresponding rotation of the latch member 154 (compare FIGS. 10C and 10D). Thus, at some angular position prior to being aligned with the longitudinal (i.e. side-to-side) direction of the main carrier frame, the control member 86 actuates the programmer 142 to a position in which the control plate 160 is locked between the stop 149 and the latch member 154, as seen in FIG. 10D. Any further counterclockwise rotation of the control member will actuate the steering mechanism to rotate the dual wheels by pulling on the steering arm 163, as will be described further presently. Any clockwise rotation of the programmer 142 from the position shown in FIG. 10D will cause the cam follower 152 to be rotated in a clockwise direction thereby similarly rotating the latch member 154 clockwise and unlatching the control plate 160. The latter motion causes the wheels to be converted to the final use position.

This is not to say that the wheels are not turned as the gooseneck assembly varies between the positions shown in FIGS. 9C and 9E. As will be observed by comparing FIGS. 10C and 10D, the steering arm 163 is in fact moved to the right, thereby rotating steering arms 43 and 44 counterclockwise as seen in FIG. 2 and turning dual wheels 39 and 40 to the position diagrammatically illustrated in FIG. 12B. It will be realized that the configuration of wheels shown in FIG. 12B represents an intermediate or conversion stage during which the implement is not moving, only the tractor is moving to cause the control member 86 to rotate.

Similarly, as the steering link 163 is moved toward the right in FIG. 2, the reversing link 167 is rotated counterclockwise, and the dual wheels 37 and 38 are rotated clockwise to the positions shown diagrammatically shown in FIG. 12D.

As the tractor is brought to a position directly to the left of the implement (again, "left" referring to the left side of the implement when it is set up for use), the control member 86 is longitudinally aligned with the main carrier frame and becomes the sole draught member as well as a steering control linkage for the implement. It will also be observed that the center draught assembly 85 is tucked away for road travel as seen in FIG. 12E, and all of the dual wheels now face the side direction. However, it will now be observed that all of the dual wheels are steerable by the rotation of the control member 86. Further, they are steered in a manner which provides great maneuverability for the entire implement to follow the tractor quite closely.

The drawings of FIGS. 9A–12F are not to be taken as drawn to scale, it is the geometry of the steering linkages and arms that cause the apparatus to steer properly in response to the turning of the tractor. That geometry is such that as the tractor steers to the left (diagrammatically illustrated in FIG. 12F), the control member is rotated slightly counterclockwise, thereby further translating the steering link 163 to the left of the apparatus in a controlled manner. This, in turn, causes the steering arm 43 to rotate counterclockwise thereby steering the dual wheels 39 to the left. Further, the steering arm 44 associated with the dual wheels 40 is also turned counterclockwise by motion of the steering link 174, but to a larger angle than the dual wheels 39. Similarly, the dual wheels 38 are turned counterclockwise slightly and the dual wheels 39 are turned counterclockwise but to a larger angle than are the wheels 38, as pictorially illustrated in FIG. 12F. This action causes the entire implement to rotate about the stabilizing transport wheel 53 which does not turn. In other words, when the implement is set up for road travel, the leading end (which is the left side in the use position) trails behind the tractor, but the far end (the right side in the use position) is turned in the opposite direction to bring the rear of the implement around behind the tractor in making a turn, as distinguished from cutting across the corner of the turn.

A similar action is undertaken by the dual wheels when the tractor steers to the right, as seen in FIG. 12D, although FIG. 12D represents a practical limit position for the right-hand steering function because any further turn to the right will, as noted above, cause the latch member 154 to pivot clockwise in FIG. 10D therby permitting the control plate 160 to rotate independently of the programmer 142. The point is, however, that the wheels between the centerline of the apparatus and the tractor are turned in the direction of the tractor with the outboard wheels 40 being turned a greater amount than the inboard dual wheels 39. Similarly, the wheels to the far side of the apparatus center line (or other intermediate point) are steered in an opposite direction to that in which the tractor is turned, again with the outboard wheels 37 being turned a greater amount than the inboard wheels 38.

This steering mechanism has been found to provide a high degree of mobility for the apparatus despite the overall great length that the apparatus might assume. For example, in the case of the illustrated embodiment, each of the tool sections may comprise eight individual planter row units, each spaced laterally at a distance of up to three feet, so that the overall length of the implement in the road travel position will be over seventy feet. An advantage of the illustrated embodiment is that a high turning ratio between the tractor and implement steering wheels is achieved.

In converting the steering from the transport position to the use position, the action of the programmer and associated steering apparatus is just the reverse of what has been described except that it will be noticed that when the tractor moves from the left side of the apparatus back toward the center, thereby rotating the control member 86 clockwise, after the angular disposition shown in FIG. 9D is reached, the programmer upon further clockwise rotation, will cause the cam member 152 (FIG. 11D) to engage the cam 141 and thereby rotate the rod 153 and latch member 154 clockwise. This will unlock the control plate 160 at some point. It will then be free to rotate independently of the programmer 142, and it will disengage the stop member 149 and rotate clockwise toward the stop 148 on the programmer (following the sequence of FIGS. 10C, 10B and 10A). If the programmer is not fully rotated counterclockwise during the return motion of the tractor, the control plate 160 will engage the stop 148 and rotate the programmer until the steering link 163 properly aligns the dual wheels for the use position. It will be appreciated that whereas the dual wheels are locked parallel to the direction of travel of the vehicle in the use position, the invention is not so limited, nor is this even always desirable. Rather, they could be steered, but preferably all in unison, in the use position to follow the tractor in aligning the tools or maneuvering in avoiding objects or the like.

Hydraulic System

FIG. 13 is a schematic diagram of the hydraulic control system for the implement described above. A control box or panel is diagrammatically illustrated by the block 179, and it is mounted within the tractor represented by the block 180. Control switches are mounted to the panel 179 for convenience acess by the operator. Five such switches designated S1-S5 are shown in FIG. 13. The switches S1-S5 of the control panel are connected by means of wires to associated solenoid valves designated V1-V5 mounted on a valve mounting block 181. Thus, control switch S1, for example, operates solenoid valve V1, and so on. The output ports of valve V1 are connected respectively to the rod end and cylinder end of a left marker cylinder generally designated 182 for raising and lowering the left side marker arm. Similarly, valve V5 is connected to operate the right marker cylinder 183.

Valve V2 is connected to control the lift cylinder 66 (FIG. 5) associated with the left tool section. The valve V3 is connected to control the lift cylinder 62 for the center tool section; and valve V5 is connected to control a lift cylinder 185 for raising and lowering the right tool section. A separate control switch S6 and associated solenoid valve V6 are located in the tractor cab for communicating hydraulic fluid under pressure to a separate set of hydraulic lines 186, 187. The line 186 is in fluid communication with the butt end of the latch cylinder 97 (FIG. 6) and the rod end of the transport wheel cylinder 57 (FIG. 2). Similarly, the line 187 is in fluid communication with the rod end of the latch cylinder and the butt end of the transport wheel cylinder. Thus, when pressurized fluid is fed, upon actuation of the switch S6 by the operator, to hydraulic line 187, the latch cylinder 97 is retracted to unlatch hook 117 and permit the gooseneck assembly 86 to rotate, while the transport wheel cylinder 57 is extended to lower the transport wheel for stability. This enables the implement to be set up for road travel as previously described. Similarly, when pressurized fluid is fed to line 186, the latch cylinder 97 is tracted for locking the gooseneck assembly to the center drawbar assembly in the use position, and the transport wheel cylinder 57 is retracted to raise the transport wheel. It will be appreciated that the weight of the transport wheel and its associated cantilevered support are applied to the rod of cylinder 57 when the transport wheel is raised. This weight tends to elongate the transport wheel hydraulic cylinder and provides a safety factor in that even if hydraulic source pressure is lost, the line 186 remains pressurized due to the weight of the transport wheel assembly tending to extend the cylinder 57 in the use position. That pressure in line 186 is communicated to the butt end of the latch cylinder 97 and also keeps that cylinder in an extended position and thus maintains the latch mechanism in the locked position. Thus, hydraulic fluid pressure from the tractor is not required to keep the hitch latched while working in the field.

Further, operator control of the switch S6 and transport wheel cylinder 57 in intermediate positions between the fully extended and fully retracted positions, permit the operator to rotate the implement about the support dual wheels. This provides the operator with control over the vertical position of the forward portion of frame member 89 of the center drawbar assembly 85, and thus enables him to guide that forward portion into the receptacle 113 as the latching mechanism is being actuated. All of this, it will be realized, is accomplished without the operator's leaving the tractor.

A feature of the apparatus and control system described herein will now be apparent. The operator is able to, upon actuation of a single switch, selectively raise any of the tool sections to bring it to the transport or nonuse position without raising any other section and without affecting the depth setting of any other tool section or the main carrier frame. This is because the carrier frame is not adjusted in elevation and each of the tool sections is mounted for being raised independently of the other tool sections and separately controlled. This facilitates, for example, planting or working point rows by simply raising the tool section that is no longer required. This is accomplished, it will be realized, from the tractor seat "on the go" without engaging or disengaging any drives or clutches on implements that may require such. Similarly, when all of the tool sections are raised, the implement may be pulled forward or converted to the transport position without disengaging drives or clutches.

It will also be observed that because the markers are arranged in the hydraulic circuit for independent operation, both markers may be retracted or extended at the same time and independently of the other. This permits the operator to mark both sides of the swath being worked in the case of a planter, as may be desired when planting is started in the middle of a field as some farmers desire.

Having thus disclosed in detail a preferred embodiment of the invention, persons skilled in the art will be able to modify certain of the structure which has been illustrated or to substitute equivalent elements for those described while continuing to practice the principle of the invention. For example, and without in any way intending to limit those areas in which substitutions may be made or the scope of equivalents, persons skilled in the art will readily appreciate that the main carrier frame may be of a length greater than or less than the three-tool section embodiment illustrated and described above. The main carrier frame need not be articulated to flex in following ground contours in the case of a shorter carrier frame.

Further, the gooseneck assembly 86 is seen to provide two separate functions. One function is that it serves as a draught member in both the use position and the transport position. In the transport position, of course, it is the sole draught member. The second function is that of a control linkage which actuates the steering mechanism as a function of the position of the tractor. In other words, when the draft assembly or control link 86 is in the position shown in FIG. 2, with the tractor in the use position centered relative to the carrier frame, the steering mechanism steers the support wheel assemblies 37-40 in the direction of travel of the tractor. In converting this system to the transport position, the gooseneck assembly or control link rotates the support wheels for the carrier frame 90° so that they are parallel to the direction of elongation of the carrier frame. Further, in the use position, the gooseneck assembly or control link actuates the steering mechanism during tractor turns to steer all four support wheel assemblies. Obviously, in the case of shorter implements, the number of support wheel assemblies could be reduced.

It will also be apparent to persons skilled in the art that whereas in the illustrated embodiment the center draught assembly 85 is parallel to the direction of travel of the vehicle, it could equally well be inclined rearwardly and to the left so that it and the gooseneck assembly 86 are symmetrical to the center line of the implement.

It is thus intended that all such modifications and substitutions, as well as others not specifically disclosed, be covered as they are embraced within the spirit and scope of the appended claims.

I claim:

1. An agricultural implement adapted to be converted between a use position and a transport position and pulled by a tractor in either of said positions comprising: a main carrier frame having a front and first and second sides; steerable support wheels for supporting said carrier frame; tools carried by said carrier frame; hitch means for coupling said frame to said tractor such that the front of said frame faces the direction of travel of said tractor when said tools are in use, said hitch means including a control member mounted between said frame and said tractor for movement between a use position and a transport position; releasable latch means for limiting the motion of said control member in said use position; and steering means responsive to the position of said control member for steering said support wheels in the forward direction in the use position and for steering said support wheels toward one of said first and second sides of said frame when said control member is moved to said transport position and said tractor moves to one of said sides of said frame.

2. The apparatus of claim 1 wherein said control member is a draught member of said hitch means coupled between said carrier frame and said tractor in said use position and in said transport position and in intermediate positions when said tractor moves between said use position and said transport position.

3. The apparatus of claim 2 wherein said hitch means further comprises second draught means mounted at its rear end to said carrier frame for rotation about a vertical axis and having its forward end adapted to be connected to said control member by said latch means when said control member is in the use position, whereby both said second draught means and said control member cooperate to hitch said frame to said tractor in the use position.

4. The apparatus of claim 3 further comprising a guide link connected between said control member and said second draught means of said hitch means for rotating said second draught means after said latch means disconnects the forward end of said second draught means from said control member and for rotating said second draught means to a transport position generally parallel to the side-to-side direction of said carrier frame when said control member is rotated to the transport position.

5. The apparatus of claim 1 wherein said steerable wheel means includes at least a first steerable wheel means to a first side of the center line of said frame in the use position and a second steerable wheel means to the other side of said center line, said first steerable wheel means being relatively close to said tractor in the transport position and second steerable wheel means being remote from said tractor in the transport position, said steering means being actuated by the positioning of said control member in the transport position to further steer said first and second steerable wheel means in the transport position in response to the turning of said tractor.

6. The apparatus of claim 5 wherein said steering means turns said first wheel means adjacent said tractor in the same direction as said tractor when said tractor turns, and wherein said steering means turns said second steerable wheel means remote from said tractor in the opposite direction to bring the rear end of said frame around a turn being made by said tractor.

7. The apparatus of claim 6 wherein said steerable wheel means further comprises third steerable wheel means located between said center line and said first steerable wheel means and steerable by said steering means in the same direction as said first steerable wheel means in response to the turning of said tractor, but at a lesser angle than said first steerable wheel means, said steerable wheel means further comprising fourth steerable wheel means supporting said frame and located between said center line and said second steerable wheel means and steerable by said steering means in the same direction as said second steerable wheel means but at a lesser angular displacement than said second steerable wheel means as said tractor turns.

8. The apparatus of claim 7 wherein said carrier frame comprises at least first and second rigid sections and means for connecting said rigid frame sections together for pivoting about an axis parallel to the direction of travel of said tractor in the use position thereby permitting said carrier frame sections to flex and follow the contour of the land during use, said mounting means for said frame sections maintaining said frame sections in longitudinal alignment both in the transport position and in the use position.

9. The apparatus of claim 5 further comprising a transport wheel means mounted to the rear of said frame in the use position and including hydraulic cylinder means actuatable from the operator's position in the tractor for selectively raising a transport wheel to a use position or lowering said transport wheel to the transpor position in which said transport wheel engages the ground to the rear of said frame and faces in the side-to-side direction of said frame.

10. The apparatus of claim 2 wherein said latch means includes a latch mechanism adapted to couple said control member to said second draught means of said hitch means when said control member is in the use position; and hydraulic cylinder means actuatable from the operator's position in the tractor for unlocking said latch mechanism, whereby said control member and said second draught assembly may be moved to their respective use positions when the tractor moves from the use position to the transport position without requiring the operator to leave his position in the tractor.

11. The apparatus of claim 10 further comprising transport wheel means mounted behind the rear of said frame in the use position and including a second hydraulic cylinder for actuating said transport wheel means between a raised use position and a lowered transport position, said hydraulic cylinder means of said latch means and said hydraulic cylinder means of said transport wheel means being coupled in the same hydraulic circuit such that when said transport wheel means is in the raised position the weight of said transport wheel induces a pressure in said latch means hydraulic cylinder to maintain said latch means in a locked position during use.

12. The apparatus of claim 7 wherein said tools comprise first and second tool sections, each tool section including a rigid tool mounting bar on which associated tools are mounted; means for mounting each tool mounting bar to an associated frame section of said carrier frame for rotation about a horizontal axis transverse of the direction of travel of said carrier frame in the use position; and hydraulic cylinder means actuatable from the operator's position on said tractor for selectively moving said tool section between a raised transport position and a lowered use position.

13. The apparatus of claim 12 wherein each of said hydraulic cylinder means for said tool sections is actuatable independently of the other whereby one of said tool sections may be raised to the transport position while the other tool section is in the use position.

14. The apparatus of claim 12 wherein each tool section further comprises depth gauging means for setting the working depth of the tools associated therewith, said carrier frame being characterized in that it remains in fixed elevational relation to its associated support wheel means in the use position and in the transport position.

15. The apparatus of claim 14 wherein each of said tool sections comprise a plurality of planter row units mounted on an associated tool mounting bar for independent vertical movement; each planter row unit including depth gauge wheels for gauging the depth thereof; and each planter section including ground-engaging drive wheel means for engaging the ground only when the planter section is lowered to the use position for providing driving power to individual planter row units associated therewith.

16. An agricultural implement adapted to be pulled by a tractor comprising: carrier frame means including support wheels; hitch means having first and second draught sections respectively mounted to said frame at laterally spaced locations for connecting said carrier frame to said tractor in the use position such that the centerline of said tractor is aligned with the fore-and-aft centerline of said carrier frame; coupling means actuatable by the operator for coupling said first and second draught sections together in the use position to fix the position of said carrier frame relative to the direction of travel of said tractor in the use position, and for uncoupling said first draught section of said hitch means when actuated to permit said second draught section to remain coupled to said tractor and to rotate as said tractor moves to the side of said carrier frame for transport; and steering means responsive to the position of said second draught section for steering said support wheels in the fore-and-aft direction of said implement in the use position, for rotating said steering wheels to the side-by-side direction as said tractor moves to the side of said carrier frame for transport, and for steering said support wheels in the transport position.

17. The apparatus of claim 16 wherein said support wheels comprise at least a first support wheel supporting the end of said carrier frame adjacent the tractor when the tractor is in the transport position, and a second steerable support wheel supporting the end of said carrier frame remote from said tractor when said tractor is in the transport position, said steering means, when actuated in the transport position, being operative to steer said first support wheel in the direction of turning of said tractor and to steer said second support wheel in an opposite angular direction to bring the rear end of said frame in the transport position around behind said tractor in making a turn.

18. The apparatus of claim 17 wherein said implement is characterized in that in converting the same to the transport position, said tractor moves to the left side of said implement, said implement further including transport wheel means located behind said frame in the use position and adapted for movement between a ground engaging position and a raised position; and hydraulic cylinder means actuatable from the operator's position of said tractor for lowering said transport wheel to engage the ground when said apparatus is converted to transport condition.

19. The apparatus of claim 18 wherein said transport wheel is mounted to prevent turning about a vertical axis and is located approximately midway of the direction of elongation of said frame, whereby when said implement is steered in the transport position, the implement rotates about said transport wheel, with the left end of said frame moving with said tractor and the remote end of said frame moving in a counter direction as said frame pivots about said transport wheel during turning.

20. The apparatus of claim 17 wherein said steering means includes a programmer mounted for rotation about the axis of rotation of said second hitch portion and having first and second limit members, said second hitch portion engaging one of said limit members during rotation from the use position to the transport position to rotate said programmer therewith for at least a portion of the motion of said second hitch portion, said second hitch portion engaging said second limit means of said programmer when rotating from the transport position to the use position; and means for connecting said programmer to said steering mechanism for said support wheels, whereby the position and steering of said support wheels is determined by the angular position of said programmer.

21. The apparatus of claim 20 further comprising means for locking said second hitch portion to said programmer as said second hitch portion is rotated toward the transport position such that when said second hitch portion is in the transport position, said programmer rotates directly therewith and effects a direct steering of said support wheel means in the transport position.

22. The apparatus of claim 21 wherein said programmer is characterized in that said first and second limit members permit a lost rotational movement of said second hitch portion during a segment of the rotational movement of said second hitch portion whereby said second hitch portion rotates through an angular displacement greater than 90°, and said programmer rotates said support wheels 90° in converting between the use and transport positions, and said programmer steers said support wheels directly in the transport position.

23. An agricultural implement adapted to be converted between a use position and a transport position and pulled by a tractor in either of said positions comprising: a main carrier frame elongated laterally in the use position; support wheels for supporting said carrier frame; tools mounted on said carrier frame; hitch means for connecting said carrier frame to be drawn by said tractor in both the use and transport positions; and including a first draught member interconnecting said carrier frame and said tractor in both of said positions, a second draught member pivotally mounted to said frame at its rear end for rotation about a vertical axis and adapted to be coupled to said first draught member at its forward end in the use position; releasable locking means for coupling said second draught member to said first draught member and to said tractor in the use position; control means actuatable by the operator to release said locking means; and a guide link interconnecting said first and second draught members to rotate said second draught member about its pivot connection to said frame into a storage position adjacent said frame as said first draught member is rotated by said tractor's moving from said use position to said transport position.

24. The apparatus of claim 23 further comprising a transport wheel; means for mounting said transport wheel behind said frame and for moving said transport wheel between a raise use position and a lowered transport position; said first draught member including receptacle means for receiving the forward portion of said second draught member in the use position, and an hydraulic cylinder actuatable from the operator's position in said tractor for raising and lowering said transport wheel in a controlled manner, thereby rotating said implement about its support wheel in the use position and permitting said operator to thereby align the forward portion of said direct second draught member with the receptacle means of said second draught member before said operator actuates said control means to lock said first and second draught members together in the use position.

25. An improved agricultural implement adapted to be pulled by a tractor comprising: frame means having a front and first and second sides and including support wheel means; hitch means for attaching said frame to said tractor in a use position in which said tractor is in front of said frame and in a transport position in which said tractor is at one side of said frame; and steering means for placing said support wheels in a fore-and-aft direction when said tractor is in said use position; said steering means placing said support wheels in a side-to-side direction when said tractor is in the transport position; said apparatus characterized in that said hitch means remains coupled between said frame and said tractor in the use position, in the transport position and when said tractor moves between said use and transport positions.

26. An agricultural implement comprising a main carrier frame elongated laterally in the use position and including a plurality of individual rigid frame sections; means for mounting adjacent carrier frame sections for rotation about a horizontal axis parallel to the direction of travel of said implement during use whereby said frame sections are articulated to follow ground contour; support wheel means for supporting said carrier frame in fixed elevation relative to the ground; a plurality of tool sections, one for each frame section of said carrier frame, each tool section including a tool mounting frame mounted for rotation about a horizontal axis transverse of the direction of travel of said vehicle in the use position; a plurality of tools mounted on said tool mounting subframe; and depth gauge means for setting the working depth of said tool frame section independently of the other tool frame sections; and hydraulic cylinder means for raising each tool frame section relative to its associated carrier frame section by rotating the same about its mounting means, each of said hydraulic cylinders being independently actuatable whereby one or more of said sections may be raised while one or more others are in use.

27. The apparatus of claim 26 wherein said tools comprise individual planter row units; means for mounting each planter row unit to its associated tool section subframe for independent movement vertically; and drive pick-up wheel means mounted to each tool section subframe for engaging the ground only in the use position to provide drive to associated ones of said planter row units, whereby when one of said tool sections is raised by its associated hydraulic cylinder, said planter row units and said drive pick-up wheel disengage the ground.

* * * * *